Figures 1, 2:
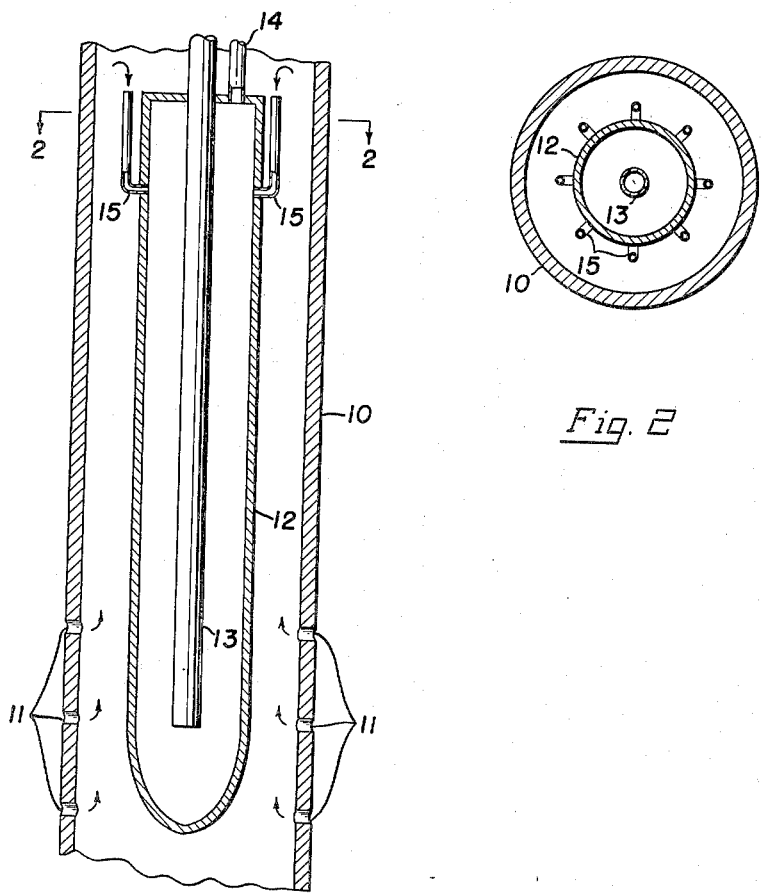

Sept. 25, 1956

M. K. ABDO ET AL 2,764,102

CONSTRICTION GAS ANCHOR

Filed Feb. 11, 1952

MILTON K. ABDO
CARL CONNALLY JR.
CARL R. SANDBERG

INVENTOR.

BY Frederick E. Dumoulin
ATTORNEY

2,764,102
CONSTRICTION GAS ANCHOR

Milton K. Abdo, Carl Connally, Jr., and Carl R. Sandberg, Dallas, Tex., assignors, by mesne assignments, to Socony Mobil Oil Company, Inc., a corporation of New York Application February 11, 1952, Serial No. 271,052

2 Claims. (Cl. 103—203)

This invention relates to the separation of gas and liquid from gas-liquid mixtures on a continuous basis, and relates more specifically to a bottom hole gas anchor employed in oil wells.

In earth formations petroleum oil is frequently found in intimate association with natural gas, both in the form of free gas bubbles entrained in the oil and in the form of dissolved gas in the oil. In wells where pumping is necessary, the presence of this gas-liquid mixture materially affects the efficiency of the pumping operation. To add to the free gas already in the oil-gas mixture, the pressure decrease inherent in the pumping operation causes the dissolved gas to form more bubbles of free gas. These bubbles of free gas uselessly occupy a part of the displacement volume of the pump, and if present in sufficient quantity, they will expand and contract with the pump stroke to cause gas lock and total cessation of delivery of the oil.

In situations where bubbles of gas tend to form it is common practice to use what is generally referred to as a "gas anchor" to continuously separate the gas from the liquid oil before it enters the pump. The most generally used method of continuous separation of gas and liquid is to allow the gas and liquid mixture to enter a chamber of such configuration that the velocity of liquid flow downward toward a pump intake tube is less than the rate of gravity segregation of the major portion of the gas and liquid, sometimes expressed as gas slip velocity. The chamber is also provided with a gas eduction port, usually at some point higher than the entry port for the gas-liquid mixture.

Gas slip velocity is a function of both the viscosity of the oil and the size of gas bubble entrained in the oil. In an oil of a given viscosity the slip velocity increases with bubble size or volume, which is proportional to the cube of the diameter of the bubble for spherical bubbles. Thus, in oils where the entrained gas bubbles are small, the slip velocity will be low, and if the slip velocity is equal to or less than the velocity of the downward flow of the oil toward the pump intake tube, the gas will be pulled into the pump. Conventional gas anchors will not remove entrained gas bubbles whose slip velocity is equal to or less than the velocity of the downward flow of the oil-gas mixture toward the pump intake tube or the gas which is dissolved in the oil.

It is an object of this invention to provide an apparatus which will effectively separate gas from oil-gas mixtures. It is another object of this invention to provide an apparatus which, when placed in an oil well, will separate gas from liquid-gas mixtures before said mixtures enter the intake tube of the oil pump. It is another object of this invention to increase the slip velocity of gas bubbles entrained in an oil and gas mixture in an oil well. It is another object of this invention to provide an apparatus which will reduce supersaturation of oil with dissolved gas in oil wells. It is another object of this invention to provide an apparatus which will prevent gas or vapor lock of the oil pump in oil wells.

These and other objects of this invention will be understood from the following detailed description of a preferred embodiment and from the accompanying drawing, wherein:

Figure 1 is a sectional view of the present invention in place in an oil well casing, showing the pump intake tube in elevation and the gas eduction tube and the constriction tubes partially in elevation and partially in section; and Figure 2 is a cross sectional view along the line 2—2 of Figure 1.

Referring to Figure 1, 10 is an oil well casing having perforations 11 through which the oil-gas mixture enters from the producing formation. Anchor shell 12 is secured to a deep-well oil pump, not shown, and encloses oil pump intake tube 13. Gas eduction tube 14 is affixed to the top of the anchor shell to allow the escape of the separated gas from the anchor shell. Constriction tubes 15 are secured around the outer periphery and near the top of the anchor shell forming elongated, small-diameter inlets through which the oil-gas mixture passes from inside the casing into the anchor shell.

The constriction tubes provide the only passage for liquid between the inside of the well casing and the interior of the anchor shell. These tubes are long and of relatively small diameter. Numerous variations in constriction tube length and diameter and in the number of and placement of the tubes may be used to obtain the best results for the particular problem involved. These possible variables are dependent upon the viscosity of the oil and the pumping rate desired in the well in which the anchor is to be used. Though these tubes are shown and described as cylindrical in cross-section and are located outside the separation chamber, it is to be understood that they may be relatively long and narrow conduits with a cross-section of any configuration and may be located inside or outside the separation chamber. In accordance with the invention, these tubes cause an acceleration of the rate of flow therein of the gas-oil mixture, which acceleration results in a coalescence of the small gas bubbles into larger gas bubbles, thus increasing the slip velocity of the bubbles to such a rate that they will, by gravity segregation, separate from the oil-gas mixture and pass out through the gas eduction tube. It has been found that, in addition to removing the free gas in the oil-gas mixture, the flow of the oil through these constriction tubes causes the dissolved gas, embodied in supersaturation of the oil, to pass out of solution therefrom with the formation of bubbles, and these bubbles, also, then separate by gravity segregation from the oil-gas mixture.

Gas eduction tube 14 extends above the liquid level in casing 10 or to a level high enough in casing 10 that the fluid head in casing 10 above the constriction tubes 15 to the top end of the eduction tube is greater than the pressure head loss due to the flow of fluid through the constriction tubes.

In operation, the oil-gas mixture from the producing formation flows through perforations 11 in casing 10 seeking a level in the casing which is dependent upon the pressure of the oil producing formation. This oil-gas mixture will generally be in the form of a liquid containing dissolved gas and entrained bubbles of free gas. At this point, of course, there is a tendency towards gravity segregation and those bubbles whose slip velocity is sufficiently great will separate. The deep well oil pump provided with the device of this invention is positioned in the casing such that the inlets of the constriction tubes 15 will be below the level of the oil-gas mixture within the casing. By means of the pumping action through tube 13, a pressure below that in the casing is created to pull the oil-gas mixture into the anchor shell and into the pump. The pump then increases the pressure to lift oil to the surface of the earth. The oil-gas mixture passes from the casing through the constriction tubes into the anchor shell 12.

During the passage of the oil-gas mixture through the constriction tubes, small bubbles of gas are coalesced into larger bubbles, which, upon entering the anchor shell itself, segregate from the oil and pass out of the anchor shell through gas eduction tube 14. The liquid oil leaves the anchor through the pump inlet tube 13 to be pumped to the surface.

Having thus described our invention it will be understood that such description has been given by way of illustration and example and not by way of limitation, reference for the latter purpose being had to the appended claims.

We claim:

1. In a bottom-hole type gas anchor the combination which comprises a tubular anchor shell closed at its top and bottom, a plurality of elongated constriction tubes of uniform small diameter secured to said anchor shell and opening into said shell near the upper end of said shell, said tubes being positioned parallel to the longitudinal axis of said shell over substantially their entire lengths and being adapted to coalesce bubbles of gas in an oil and gas mixture passing therethrough into said anchor shell, a gas eduction tube secured through the top of said anchor shell to permit separated gas to escape from said shell, and an intake tube for an oil pump secured through the top of said anchor shell and extending downwardly into said shell to a point near the bottom of said shell to permit the withdrawal of oil from said shell.

2. In a bottom-hole type gas anchor the combination which comprises a tubular shaped anchor shell closed at its top and bottom, a plurality of long, narrow, L-shaped constriction tubes secured around the outer periphery of said shell near the top of said shell, each of said constriction tubes having a short portion secured through the wall of said shell and extending radially from said shell perpendicular to the longitudinal axis of said shell and a long portion perpendicular to said short portion and extending upwardly from said short portion parallel to the longitudinal axis of said shell, said constriction tubes providing exclusive passages for oil and gas into said anchor shell and being adapted to coalesce bubbles of gas during the passage therethrough of oil and gas, a gas eduction tube secured through the top of said shell terminating at the inner surface of the top of said shell and extending upwardly therefrom parallel to the longitudinal axis of said shell, said eduction tube being adapted to permit the escape of separated gas from said shell, and an intake tube for an oil pump secured through the top of said shell parallel to the longitudinal axis of said shell and extending downwardly into said shell to a point near the bottom of said shell, said intake tube being adapted to permit the removal of oil from said shell.

References Cited in the file of this patent

UNITED STATES PATENTS

| | | |
|---|---|---|
| 1,573,051 | Gignoux et al. | Feb. 16, 1926 |
| 1,628,900 | Neilsen | May 17, 1927 |
| 2,525,897 | Greene | Oct. 17, 1950 |
| 2,652,130 | Ferguson | Sept. 15, 1953 |